Figure 1:
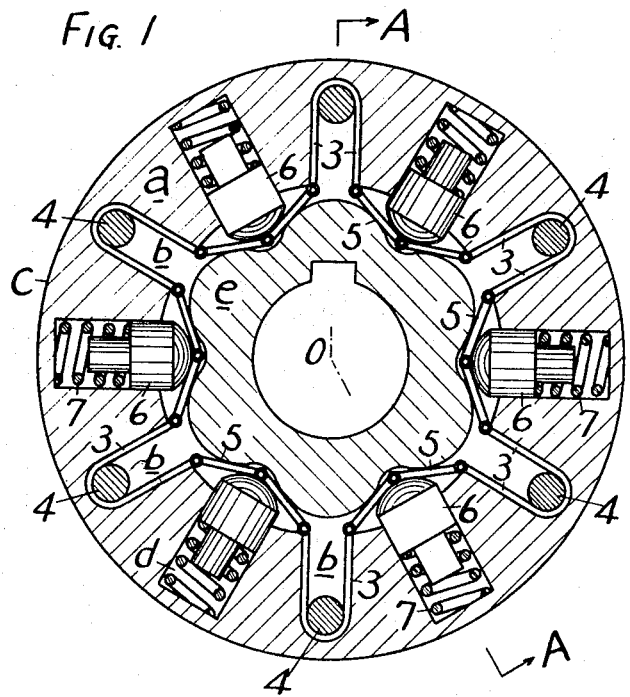

United States Patent

[11] 3,593,542

[72] Inventor Motoro Urayama
 9-8 Icibancho Koshien, Nishinomiya
 Hyogo, Japan
[21] Appl. No. 830,930
[22] Filed June 4, 1969
[45] Patented July 20, 1971

[54] LIMITED TORQUE COUPLING
 6 Claims, 4 Drawing Figs.
[52] U.S. Cl. .................................................. 64/29
[51] Int. Cl. .................................................. F16d 3/56,
 F16d 7/00
[50] Field of Search. ........................................ 64/28, 29

[56] References Cited
UNITED STATES PATENTS
2,501,648 3/1950 Ogden ........................... 64/29
2,514,228 7/1950 Dodge ........................... 64/29 X
2,930,212 3/1960 Muller ........................... 64/29
3,305,058 2/1967 Orwin ........................... 64/29 X FOREIGN PATENTS
115,152 5/1918 Great Britain ................. 64/29
431,875 7/1935 Great Britain ................. 64/29

Primary Examiner—Edward G. Favors
Attorney—Milford A. Juten

ABSTRACT: A torque coupling having its capacity limited by the torque and the speed includes a hollow cylinder having plate links which form an apex which may extend toward the rotary coupling part or outwardly therefrom, the rotary coupling part having concave and convex surfaces for receiving the apex of the plate links with the plate links being supported by U-shpad springs and the apex formed by the plate links being urged inwardly by a spring reacting against a weight engaging the apex of the plate links so that spring pressure normally produces the driving action between the hollow cylinder and the rotary coupling part while the weights are urged outwardly by centrifugal force to limit the speed at which the coupling maintains a driving relation. The concave-convex surfaces may be rounded about centers transverse to the input and output axes to permit angular relation without stress.

PATENTED JUL 20 1971

3,593,542

SHEET 1 OF 2

INVENTOR.
Motoro Urayama
BY
Milford A. Julian
attorney

LIMITED TORQUE COUPLING

This invention relates to an overload-preventive rotary coupling which transmits a torque only when it is less than a certain magnitude and which, when the torque is excessive of said magnitude, automatically cuts off the input part and the output part from each other, the input part racing, transmitting no torque to the output part. The couplings hitherto in common use for this purpose have been mechanical, electrical and fluid ones. Of the couplings the electric and the fluid have various defects that they are complex of construction and are very costly, have slips between the input and the output part, causing the coupling efficiency to be less than 100 percent, have no flexibility and are expensive in the maintenance. As for the mechanical couplings, we have a friction coupling and a coupling making use of a steel spring as is shown in the Japanese Patent Gazettes No. 36–10857 and No. Sho 38–2669, but they have this defect that they have a racing torque bigger than nothing, unable to race for a long time after the cutting off, have no flexibility, must have recourse to the consumptive part like a friction disc and are complex of construction.

In view of these defects, this invention is so devised that the input and the output coupling are connected with each other by means of more than one U-shaped springs and plate links, making use of the snapping action caused by the coupling of the U-shaped springs and the plate links, automatically to cut off the torque bigger than a certain magnitude, which removes all the defects of the above-mentioned well-known devices, and has all the advantages necessary for the rotary coupling, i.e.

1. This is a perfect overload preventive coupling with nothing of the racing torque,
2. This is a flexible coupling,
3. This is an elastic coupling,
4. This has no recourse to a consumptive part and its life span is semipermanent,
5. The effect of the cutoff torque is constant,
6. The construction is simple enough,
7. This is manufactured very easily and cheaply.

Figure 2:
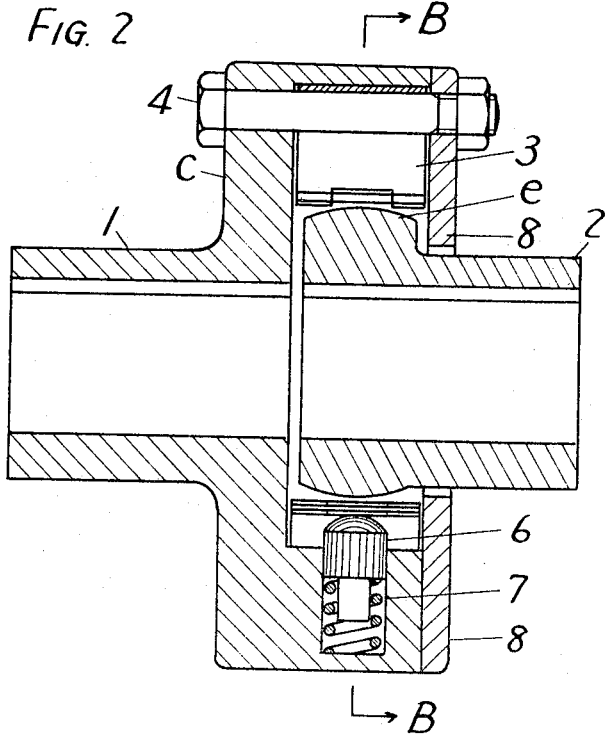
Figure 3:
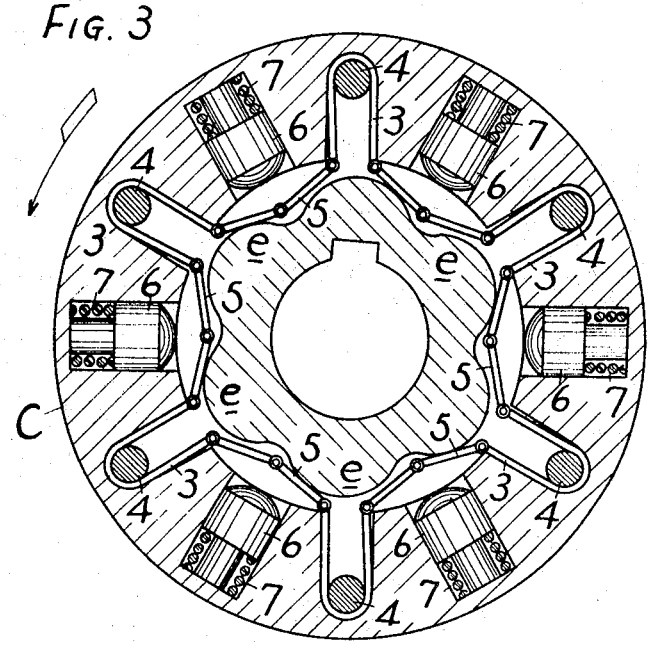
Figure 4:
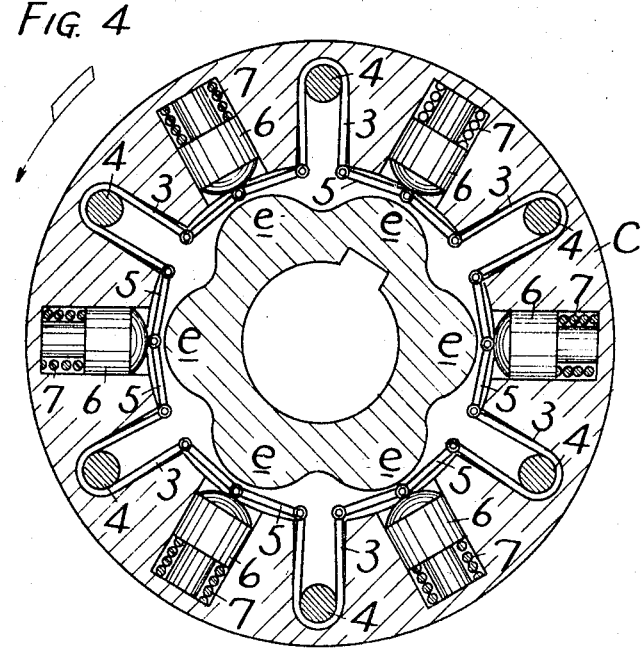

To explain concretely the points of this invention with a practical instance shown in the accompanying drawings, in which FIG. 1 is a section on the line B–B of FIG. 2, FIG. 2 is a section on the line A–C–A of FIG. 1, both FIGS. 1 and 2 showing a practical instance of this invention, FIG. 3 is an illustrative figure to explain the action of this invention in the state when the input and output couplings rotate together as one body, communicating a certain torque, FIG. 4 is an illustrative figure to explain the working of this invention in the state when the coupling is cut off between the input and the output, with the input part racing alone.

In FIG. 1 and FIG. 2, numeral 1 denotes the input coupling that is a cylinder $a$ composed of the input plate $c$ and the check lid 8 and fitted protruding on the fixed part to the end of the input axis, numeral 2 denotes the output coupling fitted inside of the cylinder $a$ and provided with more than one convexes and concaves all directed radially, numerals 3 denote respectively a U-shaped spring of the same construction inside of the circumference of the cylinder $a$ fitted with the middle inserted into the corresponding radial concavity $b$ gouged in the same radius direction with that of the corresponding convex of the output coupling 2 while both of the ends of the U-shaped spring are protruding a little way out of the edge of the opening of the radial cavity $b$, numerals 4 denote respectively a coupling bolt, holding the middle of the U-shaped spring 3 between it and the bottom of the radial slot cavity $b$, fitted piercing though at once the input plate $c$ and the cylinder $a$ and the cover 8 which is in touch with the edge of the opening on the output part, numerals 5 denote respectively a plate link, each end linked capable of free turning with the respective end of the adjacent U-shaped springs 3 and provided at its middle part with a joint freely to fold in two, numerals 6 denote respectively a centrifugal weight capable of going in and out in a hole $d$ bored between the radial slots cavities $b$ in the inner periphery of the cylinder $a$, and numerals 7 denote respectively a self-restitution coil spring fitted between the bottom of the hole $d$ and the centrifugal weight 6. The output coupling 2 shown in the practical instance of FIG. 1 has a hexagonal flower-shaped section. The six sets of the plate links 5 connected with the input coupling 1 by means of the coupling bolts 4, and the U-shaped springs 3, bending inward, fit in the concave parts of the hexagonal flower-shaped section and the input coupling 1 and the output coupling 2 are in the state to engage with each other. In this state of the couplings 1 and 2, when a certain rotatory power works between the input coupling 1 and the output coupling 2, each of the convex parts of the output coupling 2 correlatively pushes the corresponding inwardly bent link 5 outward to straighten it which in its turn pushes both ends of the U-shaped spring 3 to make them draw near. There arises inversely at this time in both ends of the U-shaped spring 3 a repelling power in proportion to the value of the distortion from the original shape, that is a power to restore both ends of the U-shaped spring 3 to their original open state, by which power the plate link 5 is induced to be bent inwardly to return to its original state. In the case when the rotatory power working between the couplings 1 and 2 is less than a certain magnitude, the power to push the plate link 5 up with the convex of the output coupling 2 to straighten it up and the repelling power to keep the U-shaped spring 3 open come to a balanced state at a certain point, and the engagement of the plate link 5 with the output coupling 2 is kept in the main in the state shown in FIG. 3, when the rotatory power is entirely transmitted from the input coupling 1 to the output coupling 2. On the contrary, when this rotatory power grows larger than a certain magnitude, the power to straighten the plate link 5 up constantly gets larger than the repelling power of the U-shaped spring 3, and the above-mentioned point where a balanced state is attained is nonexistent, and the plate link 5, completely pushed up with the convex of the output coupling 2, comes to the state shown in FIG. 4 where it is bent outward contrary to that shown in FIG. 1, and the engagement of the plate link 5 and the output coupling 2 comes off and the connection of the input coupling 1 with the output coupling 2 is completely cut off. When once this state is attained, the springing power of the U-shaped spring 3 keeps the plate link 5 in the state where it is bent outward, and the input coupling 1 races, kept completely disengaged with the output coupling 2.

In other words, the coupling of this invention works as a limited torque coupling which automatically cuts off a rotatory power larger than a certain rotatory power which is mechanically determined in proportion to the constant of the U-shaped spring 3. The following is the explanation of the workings of the centrifugal weight 6 and the self-restitution coil spring 7. In the state shown in FIG. 4, when the input coupling 1 racing, with its connection with the output coupling 2 cut off, is stopped, the centrifugal force working on the centrifugal weight 6 comes to nothing, so that the coil spring 7 compressed by the centrifugal force expands pushing up the middle of the plate link 5 hitherto bent outward to bend it inward and restores it to the original state shown in FIG. 1. This working can be performed if only the constant of the coil spring 7 is determined as large as is necessary against the elastic force of the U-shaped spring 3 to straighten the plate link 5 up and then bend it inward. The size of the centrifugal weight 6, in any number of rotation, has only to be so large as for the weight 6 to produce the centrifugal force necessary to compress the coil spring 7 outward as shown in FIG. 4.

To explain here the flexibility of the coupling of this invention, as shown in the section parallel to the axis of the output coupling 2 in FIG. 2, as the convex part $e$ of the output coupling 2 slightly presents to the axis direction a curved surface with a circular arc, even if the input axis line and that of the output axis do not make a perfectly straight line but have a slight angular difference between them, the state of the engagement of the convex of the output coupling 2 with the plate link 5 is scarcely different from that shown in FIG. 1 and no great change happens to the effect of the cutoff torque. And in the case where there is a slight difference between the input axis and that of the output axis, the difference is absorbed by the transformation of the U-shaped spring 3, which proves that this invention has the efficiency as the so-called flexible coupling imposing any excessive load on neither of the coupling bolt, the input axis or the output axis as is the case with the inflexible coupling common in use.

As is obvious from the foregoing explanation, the coupling of this invention is a kind of elastic coupling connecting the input part with the output by means of the U-shaped springs and the plate links, and a momentary impact torque on either of the input part or the output part is absorbed as an elastic energy by the U-shaped springs and is not communicated to the other, thus protecting the subsequent mechanism.

As mentioned above, this coupling has numerous advantages, and any coupling hitherto put to practical use has at most two or three of these advantages, in other words, no coupling but this invention has all the advantages necessary for the coupling. This is the very reason why the coupling of this invention is of so much use.

What I claim:

1. A torque coupling comprising a hollow cylinder and an inner cylinder having a rotary coupling part extending into the hollow outer cylinder with one cylinder adapted to be an input axis and the other cylinder adapted to be an output axis, a plurality of radially extending slots opening inwardly from the inner periphery of the outer cylinder, a U-shaped spring in each slot with the ends projecting inwardly, a plate link connected to the inner projection of each U-shaped spring and linked together to a similar plate link connected to the inner projection of an adjacent U-shaped spring to extend outwardly from a straight line position and inwardly from a straight line position between the adjacent legs of the adjacent U-shaped springs, the total length of said plate links being greater than the distance between the inner projections of adjacent legs of the U-shaped springs, the rotary coupling part having concave and convex surfaces to cooperate with the plate links to cause the outer and inner cylinders to rotate together when the plate links extend into the concave portions of the rotary coupling part, the U-shaped springs being biased to separate their legs to cause the intermediate portion of the plates between adjacent U-sahaped springs to extend in a nonstraight-line position toward the rotary coupling part to produce a driving action between the inner and outer cylinders and to extend outwardly in nondriving relation when the torque between the inner and outer cylinders exceeds a predetermined value and/or a predetermined speed, and means to urge the link plates intermediate the adjacent U-shaped springs toward the rotary coupling part to produce a driving action between the cylinders.

2. A torque coupling comprising a hollow cylinder and an inner cylinder having a rotary coupling part extending into the hollow outer cylinder with one cylinder adapted to be an input axis and the other cylinder adapted to be an output axis, a plurality of radially extending slots opening inwardly from the inner periphery of the outer cylinder, a U-shaped spring in each slot with the ends projecting inwardly, a plate link connected to the inner projection of each U-shaped spring and linked together to a similar plate link connected to the inner projection of an adjacent U-shaped spring to extend outwardly from a straight line position and inwardly from a straight line position between the adjacent legs of the adjacent U-shaped springs, the total length of said plate links being greater than the distance between the inner projections of adjacent legs of the U-shaped springs, the rotary coupling part having concave and convex surfaces to cooperate with the plate links to cause the outer and inner cylinders to rotate together when the plate links extend into the concave portions of the rotary coupling part, the U-shaped springs being biased to separate their legs to cause the intermediate portion of the plates between adjacent U-shaped springs to extend in a nonstraight-line position toward the rotary coupling part to produce a driving action between the inner and outer cylinders and to extend outwardly in nondriving relation when the torque between the inner and outer cylinders exceeds a predetermined value and/or a predetermined speed, and means to urge the plate links intermediate the adjacent U-shaped springs toward the rotary coupling part to produce a driving action between the cylinders, radial holes opening inwardly being provided on the inner periphery of the outer cylinder between the slots, a weight and a coil spring being provided in each radial hole and positioned to move the intermediate linked-together plate links inwardly at slow speeds to produce a driving action, the weights being adapted to overcome the coil spring pressure when the coupling rotates at a speed in excess of a predetermined value, thereby providing the speed control between the hollow cylinder and the inner cylinder.

3. The invention according to claim 1 in which the concave or convex surfaces of the rotary coupling part has curvature about an axis transverse to the input and output axes whereby an angular difference between the input and output axes can be accommodated without stress.

4. The invention according to claim 1 in which the slot cavities open inwardly from one end of the hollow cylinder and such one end is closed with a lid which confines the rotary coupling part in position to operate with the plate links.

5. The invention according to claim 4 in which the U-shaped springs are held in position by bolts passing through the slots and between the legs of the U-shaped springs and through the lid to maintain the parts in assembled relation.

6. The invention according to claim 1 in which all springs react between the hollow cylinder and the plate links to urge the plate links into driving relation with the concave and convex surfaces of the coupling part.